(12) United States Patent
Aldmo et al.

(10) Patent No.: US 9,746,100 B2
(45) Date of Patent: Aug. 29, 2017

(54) PNEUMATICALLY DRIVABLE VALVE ACTUATOR AND METHOD OF LOCKING A VALVE CLOSURE ELEMENT RELATIVE TO A VALVE BODY

(71) Applicant: NAF AB, Linköping (SE)

(72) Inventors: Karsten Aldmo, Vikingstad (SE); Per Lundqvist, Linköping (SE)

(73) Assignee: NAF AB, Linköping (SE)

(*) Notice: Subject to any disclaimer, the term of this patent is extended or adjusted under 35 U.S.C. 154(b) by 635 days.

(21) Appl. No.: 14/372,441

(22) PCT Filed: Jan. 18, 2013

(86) PCT No.: PCT/SE2013/050028
§ 371 (c)(1),
(2) Date: Jul. 15, 2014

(87) PCT Pub. No.: WO2013/109184
PCT Pub. Date: Jul. 25, 2013

(65) Prior Publication Data
US 2015/0020897 A1    Jan. 22, 2015

(30) Foreign Application Priority Data
Jan. 20, 2012 (SE) ...................... 1250033

(51) Int. Cl.
F16K 35/06 (2006.01)
F15B 15/14 (2006.01)
(Continued)

(52) U.S. Cl.
CPC ............ F16K 35/06 (2013.01); F15B 15/149 (2013.01); F15B 15/261 (2013.01); F16K 31/122 (2013.01); Y10T 137/7069 (2015.04)

(58) Field of Classification Search
CPC ........ F16K 36/10; F16K 36/06; F16K 31/122; F16K 31/1223; F16K 31/1225;
(Continued)

(56) References Cited

U.S. PATENT DOCUMENTS 2,932,282 A   4/1960   McKinley et al.
2,961,015 A   11/1960  Randall
(Continued)

FOREIGN PATENT DOCUMENTS

DE   3709859 A1   10/1988
EP   0638731 A1   2/1995
(Continued)

OTHER PUBLICATIONS

PCT International Search Report for International Application No. PCT/SE2013/050028 dated May 7, 2013, 5 pages.
(Continued)

Primary Examiner — F. Daniel Lopez
Assistant Examiner — Richard Drake
(74) Attorney, Agent, or Firm — Magleby, Cataxinos & Greenwood, P.C.

(57) ABSTRACT

The present disclosure provides a pneumatically drivable actuator for setting a position of a valve closure element in a valve, comprising a piston, which is moveable in a pressure chamber by influence of a drive gas, and a locking mechanism for mechanically locking the piston relative to the pressure chamber. The actuator further comprises a ventilation device for venting the drive gas from the pressure chamber while the piston is mechanically locked relative to the pressure chamber, such that pressurization of the pressure chamber is prevented.
A method of locking a valve closure element relative to a valve body of a valve that is controllable by a pneumatically driven actuator is also disclosed.

15 Claims, 3 Drawing Sheets

(51) Int. Cl.
*F15B 15/26* (2006.01)
*F16K 31/122* (2006.01)

(58) Field of Classification Search
CPC ...... F15B 15/26; F15B 15/149; F15B 15/286; F15B 15/066; F15B 15/261
USPC .......................................... 251/93, 94; 92/59
See application file for complete search history.

(56) References Cited

U.S. PATENT DOCUMENTS

| | | | |
|---|---|---|---|
| 3,463,055 A | 8/1969 | Bayles | |
| 3,699,850 A * | 10/1972 | Wagner | F15B 15/261 74/527 |
| 3,941,141 A * | 3/1976 | Robert | E21B 33/064 137/1 |
| 4,000,684 A | 1/1977 | Ruffley | |
| 6,105,484 A | 8/2000 | Kalthoff et al. | |
| 6,206,338 B1 * | 3/2001 | Trail | E21B 34/02 251/327 |
| 6,640,668 B2 | 11/2003 | George et al. | |
| 6,640,688 B1 * | 11/2003 | Harper | F15B 15/261 92/129 |
| 7,100,493 B2 * | 9/2006 | Nomura | F15B 15/24 92/130 R |
| 7,762,274 B2 * | 7/2010 | Wong | F16K 27/0263 137/219 |
| 2008/0143176 A1 * | 6/2008 | Hsu | B60P 1/28 303/89 |
| 2011/0309283 A1 | 12/2011 | Muzzo | |

FOREIGN PATENT DOCUMENTS

| | | |
|---|---|---|
| GB | 683633 A | 12/1952 |
| GB | 2404696 A | 2/2005 |
| JP | 2002213410 A | 7/2002 |

OTHER PUBLICATIONS

Written Opinion of the ISA for International Application No. PCT/SE2013/050028 dated May 7, 2013, 9 pages.
International Preliminary Report on Patentability for International Application No. PCT/SE2013/050028 dated Jul. 22, 2014, 10 pages.
Extended European Search Report for European application No. 13738631.4-1754 dated Jul. 3, 2015, 7 pages.

* cited by examiner

PNEUMATICALLY DRIVABLE VALVE ACTUATOR AND METHOD OF LOCKING A VALVE CLOSURE ELEMENT RELATIVE TO A VALVE BODY

CROSS-REFERENCE TO RELATED APPLICATIONS

This application is a national phase entry under 35 U.S.C. §371 of International Patent Application PCT/SE2013/050028, filed Jan. 18, 2013, designating the United States of America and published in English as International Patent Publication WO2013/109184 A1 on Jul. 25, 2013, which claims the benefit under Article 8 of the Patent Cooperation Treaty to Swedish Patent Application Serial No. 1250033-6, filed Jan. 20, 2012, the disclosure of each of which is hereby incorporated herein in its entirety by this reference.

TECHNICAL FIELD

The present disclosure relates to a pneumatically drivable actuator for a valve and, more particularly, to such an actuator being equipped with a safety locking device, i.e., a "lockout device."

The disclosure also relates to a method of safely locking a valve closure element relative to a valve body.

BACKGROUND

Valves equipped with pneumatically drivable actuators are widely used to control flows of gases and/or liquids in various applications, including chemical, power or other types of process plants. Such an actuator generally includes a piston, which is moveable by influence of a drive gas (often air) in a pressure chamber, with the piston being connected to the valve closure element (a ball, blade, disc, etc.) so as to cause this to open, close or become set to a predetermined position.

The term "pneumatic" here refers to actuators that are drivable by means of a gas, such as air, or a substantially inert gas, such as nitrogen.

Pneumatically drivable actuators are advantageous in comparison with electrically or hydraulically drivable actuators, since their installation and use is associated with less regulatory requirements, such as expert knowledge in electricity or hydraulics.

In connection with, e.g., maintenance of the system in which the valve is to control a flow of gas and/or liquid, it may be desirable to safely lock the valve in a predetermined position, such as open or closed, e.g., to avoid accidental closing or opening of the valve and thereby potentially ensuing hazard to operators and/or the environment.

Hence, it is known to mechanically lock the valve closure element relative to the valve body. However, such mechanical locking may require a locking device, which is arranged, e.g., between the actuator and the valve body. Such a locking device may need to be specially sized and adapted for each valve axle diameter. Moreover, the locking device may provide a mechanical play, which can reduce the accuracy in the control of the valve closure element's position.

It is also known to mechanically lock the piston in the actuator relative to the pressure chamber, as disclosed in U.S. Pat. No. 6,105,484.

There is a demand for even safer locking mechanisms.

DISCLOSURE

An object of the present disclosure is to provide a pneumatically driven valve actuator having increased safety against accidental actuation.

The invention is defined by the appended independent claims, with embodiments being set forth in the dependent claims, in the following description and in the drawings.

Hence, according to a first aspect, there is provided a pneumatically drivable actuator for setting a position of a valve closure element in a valve. The actuator comprises a piston, which is moveable in a pressure chamber by influence of a drive gas, and a locking mechanism for mechanically locking the piston relative to the pressure chamber. The actuator further comprises a ventilation device for venting the drive gas from the pressure chamber while the piston is mechanically locked relative to the pressure chamber, such that pressurization of the pressure chamber is prevented.

The actuator may be a linear actuator, e.g., for providing a sliding movement for operating a gate valve or a globe valve, or a rotatable actuator, e.g., for providing a rotary movement of a ball valve or other rotary valve.

The drive gas may be an inert gas, such as nitrogen, with other gases, or combinations thereof, not being excluded. In one embodiment, the drive gas is a gas that is acceptable to release into the environment surrounding the actuator, such as air.

The term "mechanical locking" should be understood as providing a substantially rigid connection between the piston and the piston chamber, or a body that wholly or partially forms or encloses the piston chamber. Such mechanical locking may be provided in the form of a positively interlocking engagement or a friction-based engagement. A threaded connection may be considered as a positively interlocking engagement, to the extent that the threads are self-locking, i.e., do not allow for unscrewing of the threaded connection by application of an axial force.

An actuator as set forth above provides additional safety as compared to an actuator that is merely mechanically locked, since the ability of the actuator to generate an actuating force is removed or at least severely limited. Hence, safe lockout of the valve can also be provided in a case where drive gas is accidentally applied to the actuator, thus reducing the risk of damage to the lockout mechanism.

The actuator may further comprise a transmission device, for transmitting a movement of the piston to the valve closure element.

The transmission device may comprise a rod for transmitting an essentially translational movement, or a linkage, cam, yoke or gear mechanism for transforming a translational piston movement into a rotary movement.

The ventilation device may comprise a ventilation channel, which is in permanently ventilating connection with the pressure chamber while the piston is mechanically locked relative to a wall of the pressure chamber.

The actuator may further comprise a first connector element, which is directly or indirectly connectable to the piston.

In one embodiment, the first connector element may extend axially from the piston through an axial cylinder wall, and present a connector that is accessible from outside the cylinder and that presents, or forms part of, a ventilation channel forming part of the ventilation device.

The first connector element may be connectable to the piston by means of, e.g., a threaded connection, a bayonet connection or a snap connection.

The first connector element may comprise a channel forming part of the ventilation device.

The actuator may further comprise a second connector element, which is directly or indirectly connectable to a wall at least partially forming or enclosing the pressure chamber.

The second connector element may be connectable to the wall by means of, e.g., a threaded connection, a bayonet connection or a snap connection.

The second connector element may comprise a limiter device for limiting a movement of the piston.

In one embodiment, the second connector element may extend outwardly from an axial cylinder wall, and present, or forms part of, a ventilation channel forming part of the ventilation device.

The limiter device may extend adjustably into the pressure chamber so as to provide an adjustable end stop for the piston.

The actuator may further comprise a locking device, which is directly or indirectly connectable to the piston and to a wall of the pressure chamber, such that relative movement between the piston and the pressure chamber is prevented in at least one direction.

The locking device may present a connector that is interconnectable with the connector of the first connector element.

The locking device may be designed to engage a shoulder, a pin or other type of structure, which prevents or limits relative movement between the piston and the pressure chamber in at least one direction.

The locking device may comprise a channel forming part of the ventilation device.

The locking device may further comprise means for receiving a security locking device, such as a padlock, for preventing unauthorized removal of the locking device.

The actuator may further comprise a sealing device, which is directly or indirectly connectable to the pressure chamber, such that the pressure chamber is effectively sealed and relative movement between the piston and the pressure chamber is possible.

The sealing device and the second connector element may present respective connectors for providing a sealed connection.

By "effectively sealed" is meant that the pressure chamber is sealed from the surrounding environment to such an extent as is technically relevant for the actuator.

The locking device may be at least partially integrated with the sealing device. For example, the locking device may be connected or connectable to, or formed in one piece with, the sealing device.

The actuator as claimed in any one of claims 10-13 in combination with any one of claims 14-16, wherein the locking device is mountable to the actuator only when the sealing device is detached from the actuator and vice versa.

In one embodiment, the actuator may comprise a first connector element, which is fixedly attached to the piston and which extends from the piston and out of the cylinder, and which presents, or forms part of, a ventilation channel forming part of the ventilation device, and a locking device that is adapted to engage the first connector element such that relative movement between the piston and the cylinder is prevented.

The ventilation channel may extend from the pressure chamber and along at least part of the first connector element, and wherein the ventilation channel and the locking device are so designed that when the locking device engages the first connector element, the ventilation channel provides a fluid connection between the pressure chamber and the surrounding atmosphere.

The actuator may further comprise a sealing device, which is connectable to the pressure chamber only when the locking device is not connected to the first connector member such that the pressure chamber is effectively sealed and relative movement between the piston and the pressure chamber is possible.

According to a second aspect, there is provided a method of locking a valve closure element relative to a valve body of a valve that is controllable by a pneumatically driven actuator. The method comprises mechanically locking a piston of the actuator relative to a pressure chamber of the actuator, detaching a sealing device from the actuator to open a ventilation channel for providing the venting, and mounting a locking device to the actuator, substantially at a position from which the sealing device was detached, such that the piston is mechanically locked relative to the pressure chamber.

Hence, the method comprises venting drive gas from the pressure chamber, while the piston is mechanically locked relative to the pressure chamber, so as to prevent pressurization of the pressure chamber.

The method may further comprise removing a sealing device to open a ventilation channel for providing the venting.

In the method disclosed, the step of mechanically locking a piston of the actuator relative to a pressure chamber of the actuator may comprise connecting a locking device to a connector element, which is fixedly connected to the piston and extends out of the pressure chamber, to provide mechanical locking and maintain open the ventilation channel.

DETAILED DESCRIPTION

Figure 1:
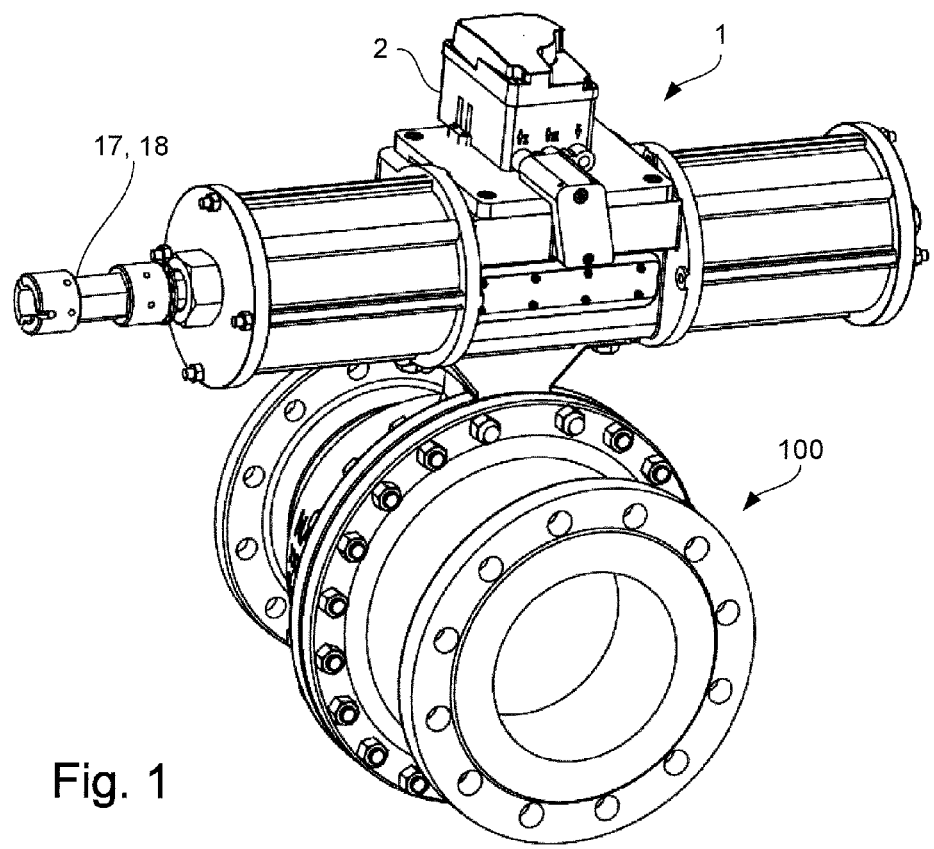
FIG. 1 schematically illustrates a valve provided with an actuator.

Referring to FIG. 1, there is disclosed a valve 100, which may comprise a rotatably arranged valve closure element, such as a ball, a disc or any other type of closure element body. The closure element in this embodiment may be opened or closed by rotation about an axis, which in the figure may be substantially vertical. The rotation of the closure element may be brought about by an actuator 1, which may be arranged on top of the valve 100 as illustrated in FIG. 1.

Figure 2:
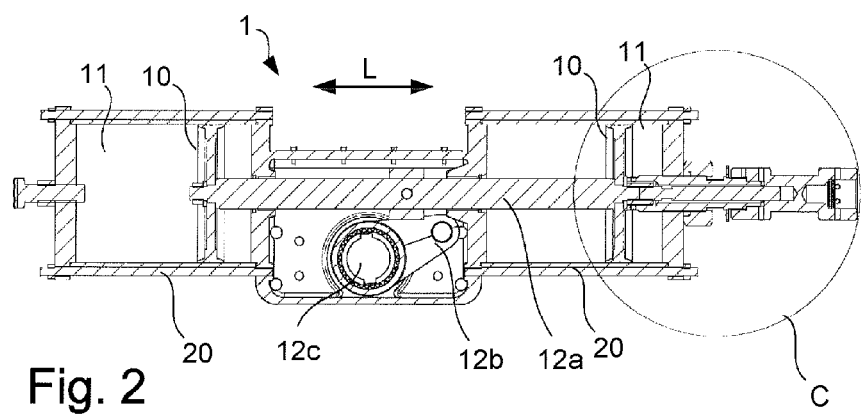
FIG. 2 is a schematic cross-sectional view of the actuator of FIG. 1.

FIG. 2 is a schematic illustration of the actuator 1, as seen in a horizontal cross-section, where the piston 10 is locked and prevented from moving relative to the pressure chamber 11. The actuator 1 comprises two pistons 10, which are moveable in a respective pressure chamber 11. The pressure chamber 11 may be formed in or by an actuator housing 20. The housing 20 may be, e.g., single walled or double walled.

The pistons are interconnected by a piston rod 12a. The piston rod 12a is arranged to act on a link mechanism 12b so as to provide a rotary movement on an outgoing axle 12c. This outgoing axle 12c is connected to the valve closure element.

The actuator 1 may further comprise a control device 2, which may comprise an interface (not shown) including an electronic circuit (not shown) and at least one pneumatic valve (not shown) for controlling the actuation of the piston 10 by supply or removal of drive gas to/from the pressure chamber 11. The electronic circuit may be enabled for communication (wireless or wired) with a central controller and it may be connected to an external, e.g., central, supply of drive gas, such as pressurized air. As further alternatives, the pneumatic device may be controllable directly by a pneumatic signal (e.g., 3-15 PSI), an electric signal (e.g., 4-20 mA) or, e.g., a data bus.

Figure 3:
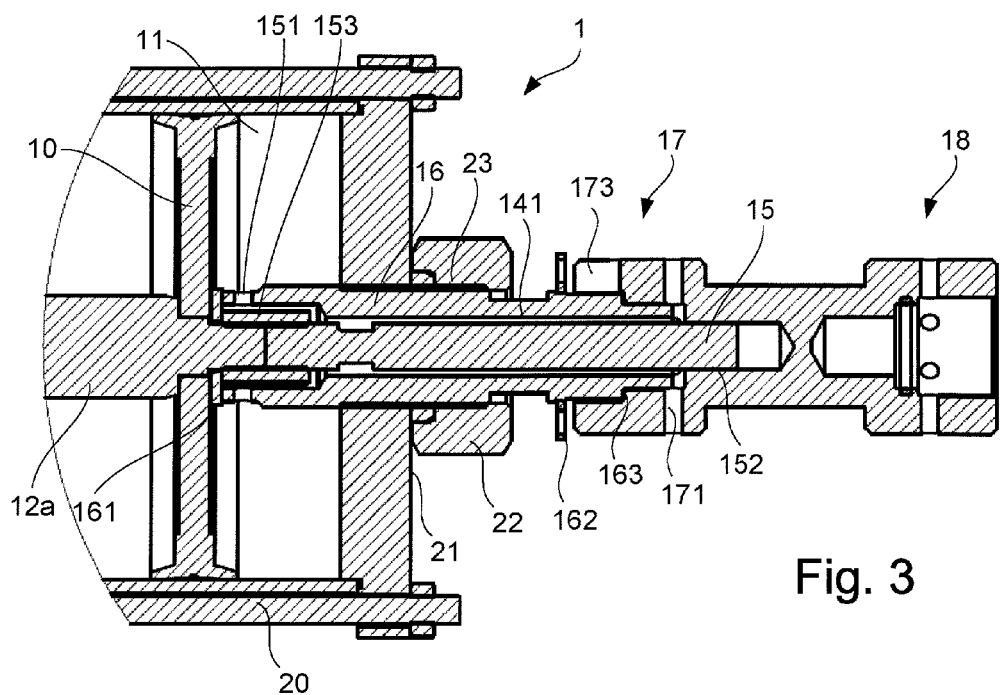
FIG. 3 is an enlarged cross-sectional view of the actuator of FIG. 1, wherein the piston is locked relative to the pressure chamber.

The part of the actuator 1 indicated by the circle C in FIG. 2 will be described in more detail below, referring to FIGS. 3-5.

In the present disclosure, the housing 20 is formed by a substantially cylindrical body, wherein the piston 10 is moveable along a longitudinal axis of the cylindrical body. At the end of the cylindrical body, a housing end wall 21 is provided.

A first connector 15 is connected, by a bushing 153, to the piston 10, such that the first connector 15, when the piston is sufficiently close to the end wall 21, extends from the piston, along the longitudinal direction L and through the end wall 21.

A second connector 16 is connected, by a first threaded portion 23, to the end wall 21 and telescopingly receives the first connector 15. The second connector 16 extends into the pressure chamber 11 and forms an end stop for the piston 10. By setting the length by which the second connector 16 extends into the pressure chamber 11, the end stop will be adjustable, thus providing a limiter 161 for the piston's axial movement. The second connector may be provided with a locking nut 22, which is connectable to the threaded portion 23. By tightening the locking nut 22 toward the end wall 21, the second connector 16 may be locked firmly in position relative to the end wall 21.

A ventilation channel 141 is formed between the connectors 15, 16. The ventilation channel 141 is in fluid communication with the pressure chamber 11 through holes 151. The ventilation channel 141 may extend outwardly to the outermost part of the second connector 16. The first connector 15 may extend outwardly beyond the second connector 16, with a threaded portion 152 being formed at the portion of the first connector 15, which extends beyond the second connector 16.

A locking part 17 may be connected to the threaded portion 152, such that relative movement between the first and second connectors 15, 16 is prevented. In the disclosed embodiment, the first connector 15 is prevented from moving inwardly by a portion of the locking part 17 abutting a shoulder 163 on the second connector 16. The locking part presents at least one channel 171, which is arranged to connect to the ventilation channel 141 when the locking part is connected to the first connector, such that fluid communication is provided between the pressure chamber 11 and the environment surrounding the actuator 1.

The locking part 17 may be provided with a security arrangement, which may comprise a number of receptacles 173, which are arranged to be aligned with axial holes on a security disc 162 that is connected to the second connector 16, such that application of, e.g., a padlock in one of the axial holes will prevent relative rotary movement between the locking part 17 and the second connector 16.

Figure 4:
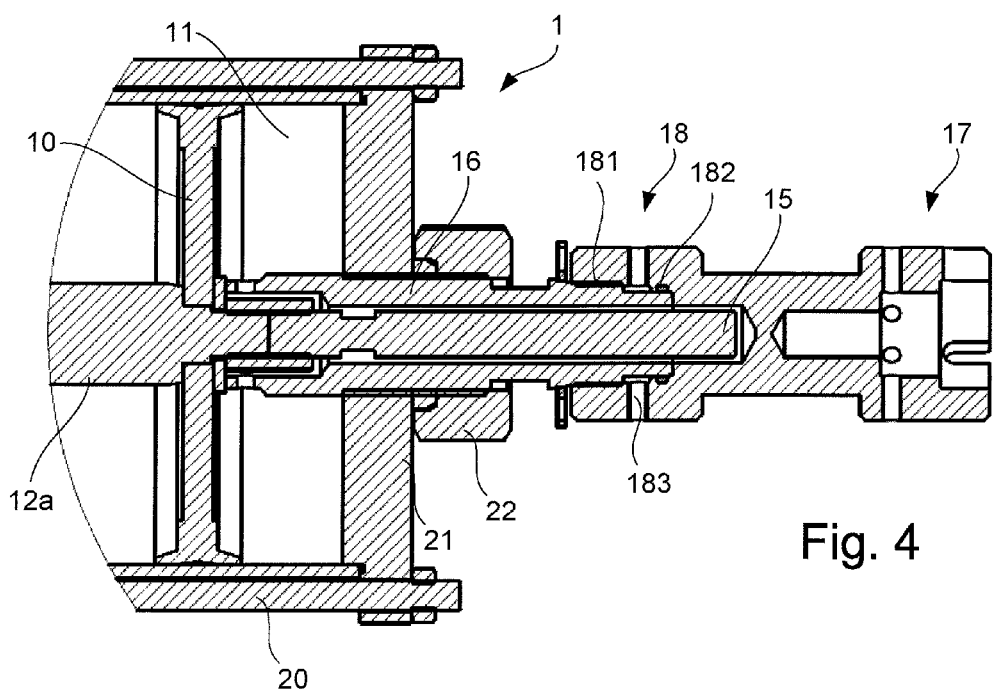
FIG. 4 is an enlarged cross-sectional view of the actuator of FIG. 1, wherein the piston is free to move relative to the pressure chamber.
Figure 5:
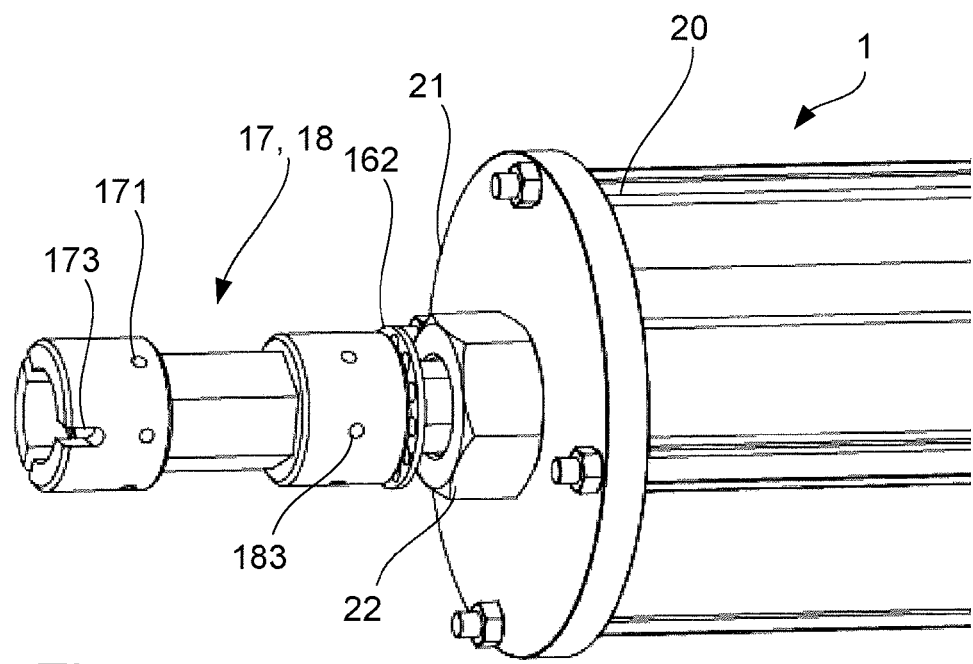
FIG. 5 is a partial perspective view of the actuator and of an integrated locking and sealing device.

Referring to FIG. 4, the actuator 1 is shown in a position where the piston 10 is moveable relative to the pressure chamber 11.

A sealing part 18 is connected by a threaded portion 181 to the second connector 16. A sealing element, here in the form of an o-ring, is arranged to seal the ventilation channel 141 from contact with the environment surrounding the actuator 1. With the sealing part 18 being connected only to the second connector 16, and not to the first connector 15, the first connector, and thus the piston, is free to move, such that the valve 100 may be pneumatically operated.

In the disclosed embodiment, the locking part 17 and the sealing part 18 are formed as an integrated, one-piece component. However, it is possible to provide these parts as separate parts or as separate, but interconnectable, parts.

Operation of the safety device will now be described.

In FIG. 4, the actuator 1 is enabled for normal operation, with the piston 10 being displaceable in the pressure chamber 11 by influence of a drive gas. There is no connection between the sealing part 18 and the piston 10 (not even indirectly through the first connector 15).

When the piston 10 is sufficiently close to the end wall 21, the first connector part 15 will telescopically extend into the axial channel of the second connector 16. Optionally, the first and second connectors 15, 16 may be so arranged that the first connector will permanently extend to some extent into the axial channel of the second connector 16.

The sealing part 18 closes the channel 141 and prevents fluid communication between the pressure chamber 11 and the environment surrounding the actuator 1.

When it is desired to safely lock the valve, the actuator is driven to set the valve closure member at the desired position (typically, but not necessary, a fully closed position). The sealing member is then unscrewed about the threaded portion 181. When sufficiently unscrewed, the seal 182 will cease to be effective and drive gas present in the pressure chamber will be vented through the ventilation channel 153, 141, 183. Further unscrewing of the sealing part 18 will cause this to separate from the actuator 1.

The sealing part 18 may then be turned 180 degrees, such that the locking part 17 can be connected by the threaded portion 152 to the first connector 15. While the locking part 17 is being connected, and also when it has become fully connected, the ventilation channel 153, 141, 171 is open, such that the fluid communication with the surrounding environment is maintained.

A security lock, such as one or more padlocks (not shown) may be connected to the holes in the security disk 162, such that unintentional unscrewing of the locking device 17 is prevented.

It should be noted that the safety arrangement disclosed herein may be applied also to, e.g., linear actuators, which may be used to set a position of a valve closure element in, e.g., a blade, gate, globe or plug valve.

The arrangement is also applicable to actuators having a single piston.

The arrangement is applicable to actuators having one, two (as illustrated) or more pressure chambers. The arrangement may be particularly useful in an actuator with two or more pressure chambers, where corresponding sides of the pressure chambers are in fluid communication with each other, and wherein venting of the drive gas is achieved for both pressure chambers simultaneously.

It should also be noted that other types of transmission mechanisms may be provided, e.g., based on a linkage, yoke, cam or gear arrangement.

The ventilation channel 141 may be formed in the first connector 15, in the second connector 16, or in both. For example, the ventilation channel may be formed between the connector members.

In another embodiment, it is possible to provide a locking member, which is insertable into the pressure chamber to such an extent as to mechanically engage an end portion of the piston 10 and at the same time provide locking against, e.g., the piston chamber wall 21 and keep a ventilation channel open.

The concepts described above may be applied to any pneumatically drivable valve actuator, including such valve actuators that comprise a resilient element, such as a spring, to provide, e.g., a return stroke force.

The invention claimed is:

1. A pneumatically drivable actuator for setting a position of a valve closure element in a valve, comprising:
   a piston, which is moveable in a pressure chamber by influence of a drive, gas;
   a locking mechanism for mechanically locking the piston relative to the pressure chamber;
   a first connector element connected to the piston, extending axially from the piston through an axial cylinder wall at least partly forming or enclosing the pressure chamber, presenting a connector that is accessible from outside the cylinder, and presenting, or forming part of a ventilation channel forming part of a ventilation device;
   a second connector element, which is directly or indirectly connectable to the wall; and
   the locking mechanism comprising a locking device, which is connectable to the first connector element and to the second connector element, such that relative movement between the piston and the pressure chamber is prevented in at least one direction;
   characterized by
   a ventilation device for venting the drive gas from the pressure chamber while the piston is mechanically locked relative to the pressure chamber, such that pressurization of the pressure chamber is prevented,
   wherein the first connector element comprises, or forms part of, a channel forming part of the ventilation device.

2. The actuator as claimed in claim 1, further comprising a transmission device for transmitting a movement of the piston to the valve closure element.

3. The actuator as claimed in claim 1, wherein the ventilation channel is in permanently ventilating connection with the pressure chamber while the piston is mechanically locked relative to a wall of the pressure chamber.

4. The actuator as claimed in claim 1, wherein the second connector element comprises a limiter device for limiting a movement of the piston.

5. The actuator as claimed in claim 4, wherein the second connector element extends outwardly from an axial cylinder wall, and presents, or forms part of, the ventilation channel.

6. The actuator as claimed in claim 1, wherein the locking device presents a connector that is interconnectable with the connector of the first connector element.

7. The actuator as claimed in claim 6, wherein the locking device comprises a channel forming part of the ventilation device.

8. The actuator as claimed in claim 7, wherein the locking device further comprises means for receiving a security lock, such as a padlock, for preventing unauthorized removal of the locking device.

9. The actuator as claimed in claim 8, further comprising a sealing device, which is connectable to the pressure chamber, such that the pressure chamber is effectively sealed and relative movement between the piston and the pressure chamber is possible.

10. The actuator as claimed in claim 9, wherein the sealing device and the second connector element present respective connectors for providing a sealed connection.

11. The actuator as claimed in claim 10, wherein the locking device is at least partially integrated with the sealing device.

12. The actuator as claimed in claim 11, wherein the locking device is mountable to the actuator only when the sealing device is detached from the actuator and vice versa.

13. The actuator as claimed in claim 12, wherein the ventilation channel extends from the pressure chamber and along at least part of the first connector element, and
   wherein the ventilation channel and the locking device are so designed that when the locking device engages the first connector element, the ventilation channel provides a fluid connection between the pressure chamber and the surrounding atmosphere.

14. The actuator as claimed in claim 13, wherein the sealing device, which is connectable to the pressure chamber only when the locking device is not connected to the first connector member such that the pressure chamber is effectively sealed and relative movement between the piston and the pressure chamber is possible.

15. A method of locking a valve closure element relative to a valve body of a valve that is controllable by a pneumatically driven actuator, comprising:
   mechanically locking a piston of the actuator relative to a pressure chamber of the actuator;
   detaching a sealing device from the actuator to open a ventilation channel for providing said venting; and
   mounting a locking device to the actuator, substantially at a position from which the sealing device was detached, such that the piston is mechanically locked relative to the pressure chamber,
   whereby drive gas is vented from the pressure chamber, so as to prevent pressurization of the pressure chamber,
   wherein the step of mechanically locking a piston of the actuator relative to a pressure chamber of the actuator comprises connecting a locking device to a connector element, which is fixedly connected to the piston and extends out of the pressure chamber, to provide said mechanical locking and maintain open the ventilation channel.

* * * * *